United States Patent
Cordonnier et al.

(10) Patent No.: US 11,400,946 B2
(45) Date of Patent: Aug. 2, 2022

(54) METHOD FOR MANAGING A POWERTRAIN OF A MOTOR VEHICLE

(71) Applicant: COMPAGNIE GENERALE DES ETABLISSEMENTS MICHELIN, Clermont-Ferrand (FR)

(72) Inventors: Francois-Jacques Cordonnier, Clermont-Ferrand (FR); Frederic Domprobst, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 237 days.

(21) Appl. No.: 16/632,262

(22) PCT Filed: Jul. 18, 2018

(86) PCT No.: PCT/FR2018/051832
§ 371 (c)(1),
(2) Date: Jan. 17, 2020

(87) PCT Pub. No.: WO2019/016471
PCT Pub. Date: Jan. 24, 2019

(65) Prior Publication Data
US 2020/0164889 A1 May 28, 2020

(30) Foreign Application Priority Data
Jul. 19, 2017 (FR) .................................. 1756844

(51) Int. Cl.
*B60W 40/10* (2012.01)
*B60W 10/06* (2006.01)
(Continued)

(52) U.S. Cl.
CPC ........ *B60W 40/1005* (2013.01); *B60W 10/06* (2013.01); *B60W 10/10* (2013.01);
(Continued)

(58) Field of Classification Search
CPC .. B60W 10/06; B60W 10/10; B60W 40/1005; B60W 40/12; B60W 50/00;
(Continued)

(56) References Cited

U.S. PATENT DOCUMENTS

| 6,269,289 B1 | 7/2001 | Toukura et al. | |
| 2013/0253782 A1* | 9/2013 | Saltsman | G06F 17/00 |
| | | | 701/51 |

(Continued)

FOREIGN PATENT DOCUMENTS

| EP | 0887211 A1 | 12/1998 |
| EP | 1 034 966 A2 | 9/2000 |

(Continued)

OTHER PUBLICATIONS

International Search Report dated Oct. 1, 2018, in corresponding PCT/FR2018/051832 (6 pages).

*Primary Examiner* — Edwin A Young
(74) *Attorney, Agent, or Firm* — Venable LLP

(57) ABSTRACT

A method for managing a powertrain (3) of a motor vehicle (1) comprises the following steps: (a) determining a predictive rolling resistance coefficient (Crr) for at least one tyre (10) of the motor vehicle (1); and (b) adapting the operation of the powertrain (3) according to the predictive rolling resistance coefficient (Crr) in order notably to optimize the energy consumption of the motor vehicle (1).

14 Claims, 2 Drawing Sheets

(51) Int. Cl.
*B60W 10/10* (2012.01)
*B60W 50/00* (2006.01)

(52) U.S. Cl.
CPC ..... *B60W 50/00* (2013.01); *B60W 2050/0037* (2013.01); *B60W 2520/04* (2013.01); *B60W 2520/10* (2013.01); *B60W 2520/28* (2013.01); *B60W 2530/10* (2013.01); *B60W 2530/20* (2013.01); *B60W 2555/20* (2020.02); *B60W 2555/40* (2020.02); *B60W 2710/06* (2013.01); *B60W 2710/10* (2013.01)

(58) Field of Classification Search
CPC ......... B60W 2555/20; B60W 2555/40; B60W 2050/0037; B60W 2520/04; B60W 2520/10; B60W 2520/28; B60W 2530/10; B60W 2530/20; B60W 2710/06; B60W 2710/10

See application file for complete search history.

(56) References Cited

U.S. PATENT DOCUMENTS

| 2016/0193919 A1* | 7/2016 | Zhang ................... B60L 3/102 |
| | | 180/197 |
| 2017/0327109 A1* | 11/2017 | Watanabe ............... B60T 8/321 |
| 2021/0229508 A1 | 7/2021 | Domprobst et al. |

FOREIGN PATENT DOCUMENTS

| WO | 2013/015780 A1 | 1/2013 |
| WO | 2014/078421 A2 | 5/2014 |
| WO | 2014/149043 A1 | 9/2014 |

\* cited by examiner

METHOD FOR MANAGING A POWERTRAIN OF A MOTOR VEHICLE

TECHNICAL FIELD OF THE INVENTION

The present invention relates to a method for managing a motor vehicle powertrain.

TECHNICAL BACKGROUND OF THE INVENTION

In a motor vehicle, it is of vital importance to optimize the energy consumption of the motor vehicle. Specifically, what with the increasing scarcity and cost of fossil fuels, the regulations regarding pollutant emissions, and the complexity of the powertrains, it is becoming difficult to be able to operate a motor vehicle optimally.

More particularly, in the case of electrically powered motor vehicles, the autonomy is a decisive factor that requires optimal management of the available energy.

SUMMARY OF THE INVENTION

It is an object of the invention to propose a method for managing a powertrain of a motor vehicle that makes it possible better to predict the way in which the tyre will behave in order to assist with optimizing the energy consumption of the motor vehicle.

To this end, the invention relates to a method for managing a powertrain of a motor vehicle, characterized in that it includes the following steps:

a) determining a predictive rolling resistance coefficient for at least one tyre of the motor vehicle;

b) adapting the operation of the powertrain according to the predictive rolling resistance coefficient in order notably to optimize the energy consumption of the motor vehicle.

Advantageously according to the invention, the method makes it possible to determine the future evolution of the rolling resistance coefficient of a tyre incorporated into a motor vehicle. This predictive rolling resistance coefficient is a new value which may be of particular utility to various control systems of a motor vehicle.

Advantageously according to the invention, the method notably makes it possible to control the powertrain of the motor vehicle more finely, by having available the future evolution of the rolling resistance coefficient for each tyre, for example in order to determine when to change gear in a gearbox, in order to adapt the torque applied to the tyre in order to regulate the speed, in order to adapt the movement of an electronic clutch, and more generally to optimize the operation of the motor vehicle.

In addition, in the case of a hybrid motor vehicle comprising several sources of energy, it is particularly beneficial to make use of the future evolution of the rolling resistance coefficient of the tyres in order to determine which source of energy needs to be utilized and/or recharged, and according to what operation. As an ancillary issue, it also becomes possible to better determine the autonomy of the energy sources used and be better able to inform the user of the motor vehicle.

According to other optional features in the implementation of the invention:

step a) is carried out on the basis of at least one value out of the pressure, the temperature, the loading and the rotational speed of the tyre, and of characteristic data concerning the tyre;

step a) also takes account of the ambient temperature in which the tyre is operating;

step a) is carried out using the equation:

$$Crr(t) = Crr_{stab}(T_{amb}, C, P, V) \cdot [1 + k \cdot (T(t) - T_{stab})]$$

in which $Crr_{stab}$ corresponds to the minimum value for the rolling resistance coefficient, T corresponds to the internal temperature of the tyre, $T_{stab}$ corresponds to the stabilized internal temperature of the tyre at the operating point C, P, V, $T_{amb}$, and k corresponds to the coefficient of temperature-sensitivity of the rolling resistance;

step a) also takes account of the tyre wear of the tyre;

step a) is carried out even when the motor vehicle is stationary;

step a) is carried out as long as the temperature of the tyre, measured during step a), is higher than a reference temperature;

the reference temperature is higher than or equal to the ambient temperature in which the tyre is operating;

the adaptation in step b) also takes account of a predictive variation in altitude of the motor vehicle;

the adaptation in step b) also takes account of a predictive variation in the speed of the motor vehicle;

step b) adapts the operation of a gearbox and/or of an engine of the powertrain.

BRIEF DESCRIPTION OF THE DRAWINGS

Further particular features and advantages will become clearly apparent from the following description thereof, which is given by way of entirely non-limiting example, with reference to the appended drawings, in which.

DETAILED DESCRIPTION OF AT LEAST ONE EMBODIMENT OF THE INVENTION

In the various figures, elements that are identical or similar bear the same references, possibly supplemented by a suffix. The description of their structure and of their function is therefore not systematically repeated.

A "tyre" means all types of resilient tread, whether or not it is subjected to an internal pressure.

A "tread" means a quantity of rubbery material delimited by lateral surfaces and by two main surfaces, of which one, referred to as the tread surface, is intended to come into contact with a road surface when the tyre is being driven on.

The invention applies to any type of tyre, notably to tyres intended to equip motor vehicles of the passenger vehicle, SUV ("Sports Utility Vehicle"), two-wheel vehicle (notably motorcycle) or aircraft type, industrial vehicles selected from vans, heavy-duty vehicles, that is to say underground trains, buses, heavy road transport vehicles (lorries, tractors, trailers), off-road vehicles, such as heavy agricultural or construction vehicles, or other transportation or handling vehicles.

Figure 1:
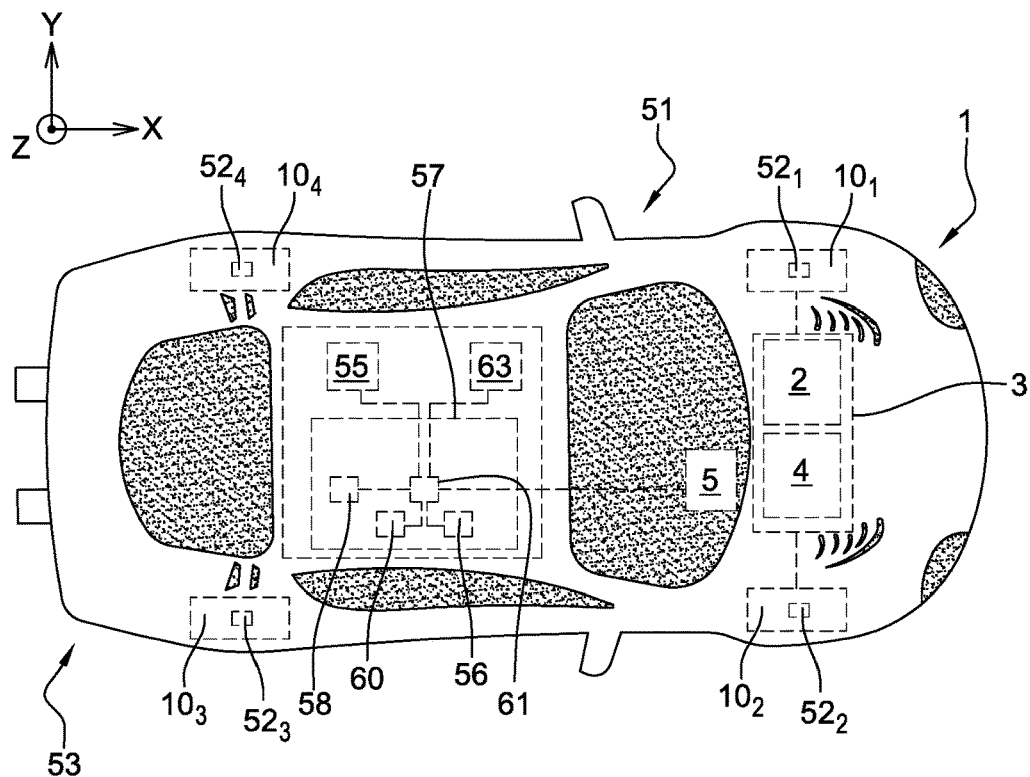
FIG. 1 is a schematic view of a motor vehicle using a method for managing a powertrain according to the invention.

In everything that follows, orientation terms are to be understood with reference to the orthogonal frame of reference considered with reference to the normal direction of travel of a motor vehicle 1, depicted in FIG. 1, and which makes a distinction between:

- a horizontal longitudinal axis X, extending from the rear towards the front;
- a horizontal transverse axis Y, extending from right to left;
- a vertical axis Z, extending from the bottom upwards.

The term "horizontal" is defined with reference to the XY plane, the term "vertical" is defined with reference to the XZ or YZ plane.

The invention relates to a method for managing a motor vehicle powertrain, comprising a step of determining the rolling resistance coefficient of one (or several) tyre(s). Specifically, it has been found that, from the measurement of the condition of a tyre, it is possible to determine the future evolution of the rolling resistance coefficient of the tyre. Now, advantageously according to the invention, this type of information is not currently available even though it would make it possible to be able to manage, for example, the energy of a motor vehicle better.

Indeed it will be appreciated that the powertrain of the motor vehicle can be controlled more finely, by having this information available, for example in order to determine when to change gear in a gearbox, in order to adapt the torque applied to the tyre in order to regulate the speed, in order to adapt the movement of an electronic clutch, and more generally to optimize the operation of the motor vehicle.

Furthermore, in the case of a hybrid motor vehicle comprising several sources of energy, such as, for example, electrical, pneumatic or thermal energy, it is particularly beneficial to make use of the future evolution of the rolling resistance coefficient of the tyre in order to determine which source of energy needs to be utilized and/or recharged, and according to what operation. As an ancillary issue, it also becomes possible to better determine the autonomy of the energy sources used and be better able to inform the user of the motor vehicle.

By way of entirely nonlimiting example, in the case of hybrid motor vehicles, a strategy of the ECMS (abbreviation for "Equivalent Consumption Minimization Strategy") type is sometimes used. This is a real-time control strategy based on the theory of optimal control. It consists in considering the electrical energy accumulator of the motor vehicle as an auxiliary fuel tank, and in choosing the control that minimizes the total energy drawn from the two tanks. Use is made of a coefficient that acts like a variator of the cost of the electrical energy. The higher it is, the more expensive the electrical energy is to use, and the more advantageous it will be to recover same (by performing regeneration). The lower it is, the less expensive the electrical energy is and therefore the more advantageous it is to use, jointly with the combustion engine, or indeed alone. It is therefore immediately apparent that this coefficient is influenced by the amount of energy that can be recovered, notably during braking, which is dependent on the rolling resistance of the tyres at the time of operation.

Advantageously according to the invention, it has been found that the rolling resistance coefficient of the tyres, and therefore the consumption of a motor vehicle, varies notably as a function of the rotational speed of the tyre, of the temperature of the tyre, of the loading of the tyre, and of the pressure of the tyre.

Studies have effectively revealed that the rolling resistance coefficient of a tyre decreases between the tyre being cold and the tyre being hot down to a minimum value that is specific to the tyre dependent on the above characteristics. Thus, the higher the speed and/or the longer the running time, the more quickly the rolling resistance coefficient will approach its minimum value.

Figure 2:
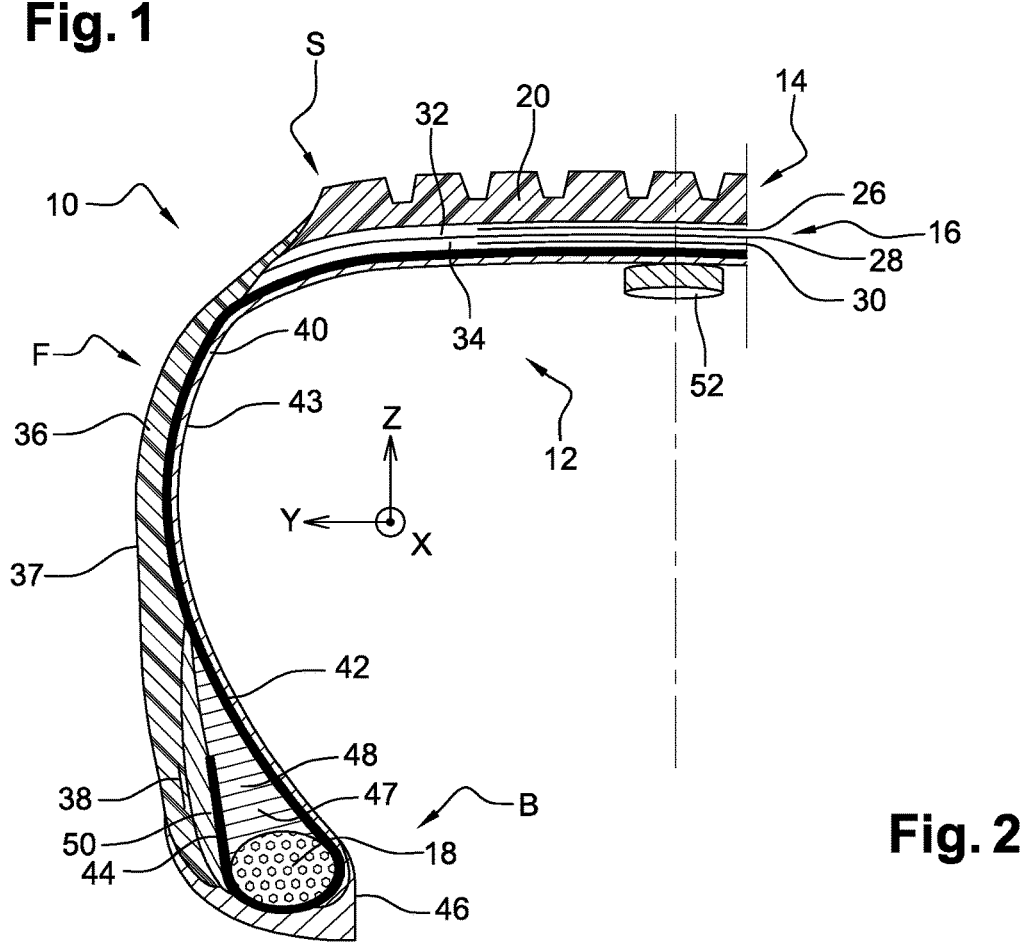
FIG. 2 is a partial view in cross section of one example of a tyre monitored by the method according to the invention.

As illustrated by way of example in FIG. 2, a tyre 10 comprises a structure 12 and tread 14. The structure 12 comprises a central reinforcement 16 extended by two external sidewalls F and two beads B sometimes referred to as lower sidewalls. Only one sidewall F and only one bead B have been depicted in FIG. 2. The tread 14 and the central reinforcement 16 of the structure 12 form a crown S of the tyre 10.

Two bead wires 18 (only one is depicted) are embedded in the beads B. The two bead wires 18 are arranged symmetrically with respect to a median radial plane M of the tyre 10. Each bead wire 18 exhibits symmetry of revolution about a reference axis. This reference axis, substantially parallel to the direction Y, is substantially coincident with an axis of revolution of the tyre 10.

The tread 14 comprises tread patterns 20. The reinforcement 16 comprises metal plies 26, 28 and 30 embedded in rubber masses 32 and 34. A rubber mass 36 extends radially from the crown S as far as the bead wire 18 of the bead B, delimiting an exterior surface 37 of the sidewall F and of the bead B. In addition, in the example described, the bead B comprises an annular ply 38 made up of metal reinforcers that are inclined with respect to the circumferential direction.

The tyre 10 also comprises an airtight inner liner layer 40 and also a carcass ply 42. This layer 40 and this ply 42 are of toroidal overall shape and are both coaxial with the bead wires 18. The layer and the ply 40 and 42 extend between the two annular bead wires 18 of the tyre 10, passing via the crown S. The carcass ply 42 is wrapped around the bead wires 18 via its ends 44 each of which forms a turnup on one of the bead wires 18. The layer 40 has an internal surface 43 intended to be in contact with the air contained inside the tyre 10.

The bead B also comprises an annular protective rubber mass 46 intended to make it possible, in part, for the tyre 10 to be secured radially and axially on a rim. The bead B of the tyre 10 also comprises filling rubber masses 48, 50 of a volume V comprised between the carcass ply 42 and the mass 36.

It will therefore be appreciated that each tyre 10 has its own characteristic data dependent on its build and on the materials used therein. The rolling resistance coefficient of a tyre 10 will therefore be deduced from prior measurements of the tyre 10 conducted on test beds and/or from simulations by varying the running conditions in order, for example, to obtain thermomechanical finite element models.

The invention relates to a method for managing a powertrain 3 of a motor vehicle 1 comprising a first step a) intended to determine the predictive rolling resistance coefficient Crr for at least one tyre 10 of the motor vehicle 1 and a step b) intended to adapt the operation of the powertrain 3 according to the predictive rolling resistance coefficient Crr in order to optimize the energy consumption of the motor vehicle 1.

Step a) is carried out on the basis of at least one value out of the pressure P, the temperature T, the loading C and the rotational speed V of the tyre 10. This step a) may for example be carried out using a monitoring system 51 fitted with a device 53 for measuring the condition of the tyre 10, designed to determine at least one value out of the pressure, the temperature, the loading and the rotational speed of the tyre 10. Such a measurement device 53 may for example comprise at least one detection element 52 mounted in the tyre 10. By way of example illustrated in FIG. 1, the motor vehicle 1 may thus comprise a measurement device 53 comprising a detection element $52_1$, $52_2$, $52_3$, $52_4$ in each tyre $10_1$, $10_2$, $10_3$, $10_4$. Such detection elements 52 may for example be of the TMS (Tyre Mounted System) type and each be attached against the internal surface 43 of a tyre 10, as disclosed by way of example in document EP 0 887 211. Of course, the measurement device 53 may also gather measurements already accessible to the motor vehicle 1 such as, for example, the ambient temperature $T_{amb}$, the loading C and the speed V of the motor vehicle 1.

Step a) may then calculate the predictive rolling resistance coefficient Crr as a function of these data. It will therefore be appreciated that step b) may for example determine the predictive rolling resistance coefficient Crr from the thermomechanical finite element models of the tyre 10 as explained hereinabove by means, possibly, of successive iterations in order to offer a value that is as refined as possible. This determining of the resistance coefficient Crr may also be carried out by comparison with a known behaviour law, on the basis of physical measurements. Of course, the thermomechanical finite element models may take account of other values such as, for example, the outside ambient temperature $T_{amb}$ or the level of tread wear of the tyre 10.

This calculation can be obtained using a monitoring module 55 designed to receive the data measured by the device 53 that measures the condition of the tyre 10. The monitoring module 55 may comprise a data acquisition element for acquiring data from the device 53 that measures the condition of each tyre 10. More particularly, the monitoring module 55 may comprise an acquisition element capable of receiving the data from each detection element 52 by wire, or by wireless communication.

The monitoring system 51 may further comprise a prediction module 57 designed to estimate the predictive rolling resistance coefficient Crr of the tyre 10. Step a) could therefore be carried out by the prediction module 57 with the aid of an element 56 for storing the characteristics of the tyre 10, of an element 61 for calculating the data of the monitoring module 55 with respect to those of the element 56 that stores the characteristics of the tyre 10, making it possible to determine the future evolution of the rolling resistance coefficient of the tyre. Each calculation may then be recorded on a storage element 58 in order to know the history of the calculations and feed, for example, external massive data to the motor vehicle 1. Specifically, it will therefore be appreciated that, after a certain length of time, the monitoring system 51 contains a compilation of values of the predictive rolling resistance coefficient Crr recorded in the storage element 58 that makes it possible to monitor the evolution of the estimated values of the rolling resistance coefficient of each tyre 10 over the course of time.

Of course, the elements used, such as the element 56 for storing the characteristics of the tyre 10, or the storage element 58, are not necessarily mounted on the vehicle but could be physically remote, namely could communicate with the motor vehicle from another location. By way of example, the element 56 for storing the characteristics of the tyre 10 and/or the element 58 for storing the history of the calculations could thus belong to a server that could be remotely interrogated by a telematic system of the motor vehicle 1.

By way of entirely nonlimiting example, step a) could be carried out by the calculation element 61, using the equation:

$$Crr(t)=Crr_{stab}(T_{amb},C,P,V)\cdot[1+k\cdot(T(t)-T_{stab})]$$

in which:

$Crr_{stab}$ corresponds to the minimum value for the rolling resistance coefficient of the tyre 10;

T corresponds to the internal temperature of the tyre;

$T_{stab}$ corresponds to the stabilized internal temperature of the tyre at the operating point C, P, V, $T_{amb}$;

k corresponds to the coefficient of temperature-sensitivity of the rolling resistance.

Of course, step a) may take into consideration other values such as, for example, the variation in altitude and/or the variation in prescribed speed limit and/or the tyre tread wear history, which values are already accessible to the motor vehicle 1 in situ, or by interrogating a remote server. As a result, the calculation element 61 could take account of other values such as, for example, the variation in altitude and/or the variation in prescribed speed limit as supplied by the satellite navigation device 63 and/or an element 60 that stores the tread wear history of each tyre 10 of a device (not depicted) that measures the tread wear of each tyre 10, these values being already accessible to the motor vehicle 1.

Figure 3:
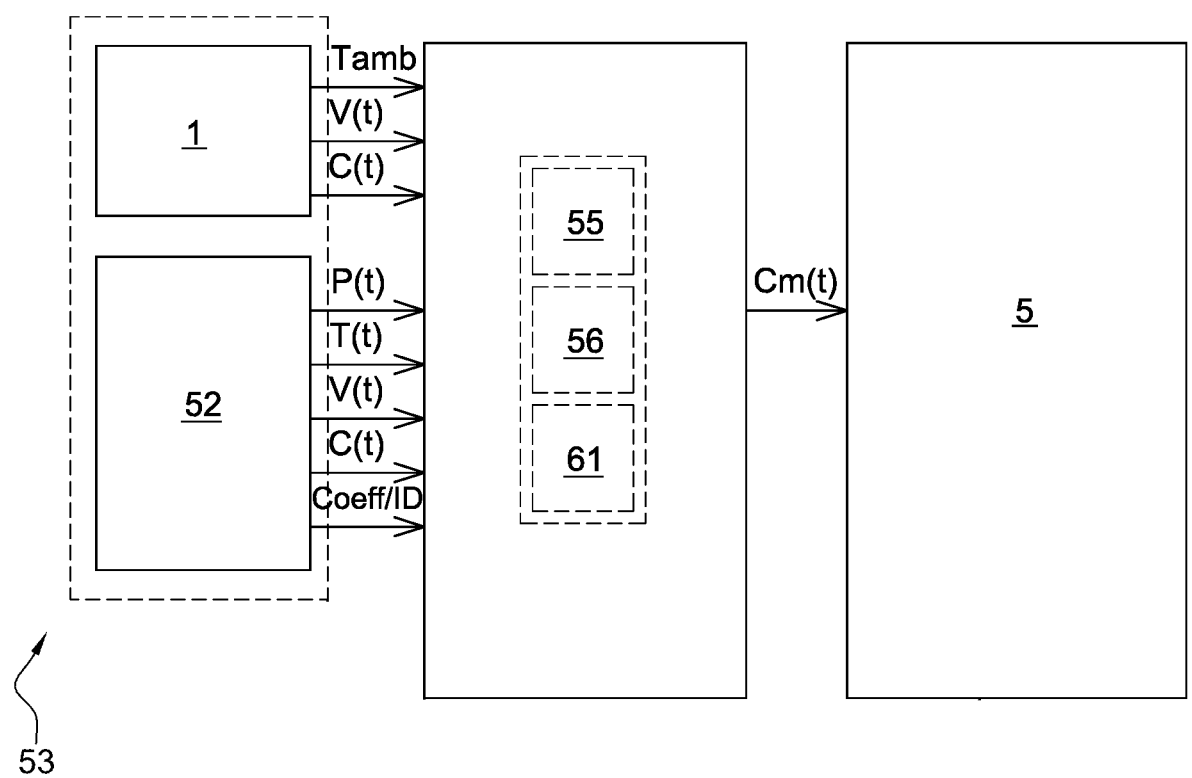
FIG. 3 is a block diagram of a method for managing a powertrain according to the invention.

According to one advantage of the management method according to the invention and illustrated in FIG. 3, it will be appreciated that the predictive rolling resistance coefficient Crr can be estimated even when the tyre 10 is stationary, namely when the motor vehicle 1 is at a standstill. The predictive rolling resistance coefficient Crr will therefore increase during the stationary or parked-up time. Advantageously according to the invention, it is possible to finely determine the future evolution of the rolling resistance coefficient of a tyre 10. Specifically, the advantage of the invention, which takes account of the predictive rolling resistance coefficient Crr, notably after the tyre 10 becomes stationary after running for several hours, can be immediately deduced therefrom. Thus, instead of considering the tyre 10 as being cold once it becomes stationary, namely once the motor vehicle 1 has come to a standstill, the method advantageously makes it possible to take into consideration the predictive rolling resistance coefficient Crr that is far closer to reality.

As a preference, step a) is carried out as long as the temperature of the tyre (10), as measured during step a), is higher than a predetermined reference temperature. As a preference, the reference temperature is greater than or equal to the external ambient temperature $T_{amb}$ such as, for example, equal to $T_{amb}+10°$ C.

Advantageously according to the invention, the method makes it possible to control the powertrain 3 of the motor vehicle 1 more finely, via the device 5 for controlling the powertrain 3, by having available the future evolution of the rolling resistance coefficient for each tyre 10, for example in order to determine when to change gear at the gearbox 2, in order to adapt the torque applied to the tyre 10 in order to regulate the speed of the motor vehicle 1, in order to adapt the movement of an electronic clutch, and more generally to optimize the operation of the motor vehicle 1.

In addition, in the case of a hybrid motor vehicle comprising several sources of energy, such as, for example, thermal, pneumatic and/or electrical energy, it is particularly beneficial to make use of the predictive rolling resistance coefficient Crr of each tyre 10 in order to determine which source of energy needs to be utilized and/or recharged, and according to what operation on the part of the device 5 that controls the powertrain 3. As an ancillary issue, it also becomes possible to better determine the autonomy of the energy sources used and be better able to inform the user of the motor vehicle 1.

The invention is not limited to the examples presented, and other alternative forms of embodiment will be clearly apparent to a person skilled in the art.

It is notably possible to carry out the methods using an indirect stream of information via a server in which there are performed statistical processing operations regarding the history of the information and an analysis of massive data that would make it possible to address the problem of how the rolling resistance evolves with tyre wear by using remote sources of information. By way of example, massive-data processing with history management could be performed in order to incorporate the effects of tyre wear on the minimum rolling resistance coefficient, also referred to as the stabilized coefficient, coupled with the use of a device external to the motor vehicle 1 for measuring tyre wear such as, for example, when the motor vehicle 1 is being serviced or passes through an automatic-detection gantry that increments the distance covered by the tyres.

The invention claimed is:

1. A method for managing a powertrain of a motor vehicle comprising the following steps:
  (a) determining a predictive rolling resistance coefficient Crr for at least one tire of the motor vehicle on the basis of an internal temperature T of the at least one tire; and
  (b) adapting operation of the powertrain according to the predictive rolling resistance coefficient Crr in order to optimize energy consumption of the motor vehicle.

2. The method according to claim 1, wherein step (a) is carried out on the basis of the internal temperature T of the at least one tire and on the basis of characteristic data concerning the at least one tire.

3. The method according to claim 2, wherein step (a) takes account of an ambient temperature $T_{amb}$ in which the at least one tire is operating.

4. The method according to claim 3, wherein step (a) is carried out using the equation:

$$Crr(t)=Crr_{stab}(T_{amb},C,P,V)\cdot[1+k\cdot(T(t)-T_{stab})]$$

in which:
  $Crr_{stab}$ corresponds to a minimum value for the rolling resistance coefficient;
  T corresponds to the internal temperature of the at least one tire;
  $T_{stab}$ corresponds to a stabilized internal temperature of the at least one tire at an operating point C, P, V, $T_{amb}$; and
  k corresponds to a coefficient of temperature-sensitivity of rolling resistance.

5. The method according to claim 2, wherein step (a) takes account of tire wear.

6. The method according to claim 2, wherein step (a) is carried out when the motor vehicle is stationary.

7. The method according to claim 2, wherein step (a) is carried out as long as the internal temperature of the at least one tire, as measured during step (a), is higher than a reference temperature.

8. The method according to claim 7, wherein the reference temperature is higher than or equal to an ambient temperature $T_{amb}$ in which the at least one tire is operating.

9. The method according to claim 2, wherein step (a) is carried out on the basis of at least one value selected from pressure P, loading C and rotational speed V of the at least one tire.

10. The method according to claim 1, wherein adaptation in step (b) takes account of a predictive variation in altitude of the motor vehicle.

11. The method according to claim 1, wherein adaptation in step (b) takes account of a predictive variation in speed of the motor vehicle.

12. The method according to claim 1, wherein step (b) adapts operation of a gearbox of the powertrain.

13. The method according to claim 1, wherein step (b) adapts operation of an engine of the powertrain.

14. The method according to claim 1, wherein step (a) determines the predictive rolling resistance coefficient Crr of several tires of the motor vehicle.

* * * * *